(12) United States Patent
Kim

(10) Patent No.: US 9,809,125 B2
(45) Date of Patent: Nov. 7, 2017

(54) APPARATUS FOR TRANSMITTING WIRELESS POWER FOR ELECTRIC CAR

(71) Applicant: Hyunmin Kim, Seoul (KR)

(72) Inventor: Hyunmin Kim, Seoul (KR)

(*) Notice: Subject to any disclaimer, the term of this patent is extended or adjusted under 35 U.S.C. 154(b) by 79 days.

(21) Appl. No.: 14/906,454

(22) PCT Filed: Jul. 23, 2014

(86) PCT No.: PCT/KR2014/006698
§ 371 (c)(1),
(2) Date: Jan. 20, 2016

(87) PCT Pub. No.: WO2015/012589
PCT Pub. Date: Jan. 29, 2015

(65) Prior Publication Data
US 2016/0159233 A1 Jun. 9, 2016

(30) Foreign Application Priority Data
Jul. 23, 2013 (KR) .................. 10-2013-0086484

(51) Int. Cl.
*B60L 11/18* (2006.01)

(52) U.S. Cl.
CPC ......... *B60L 11/1829* (2013.01); *B60L 11/182* (2013.01); *B60L 11/1824* (2013.01); *B60L 11/1848* (2013.01); *B60L 11/1827* (2013.01); *B60L 11/1833* (2013.01); *B60L 11/1838* (2013.01); *B60L 2230/10* (2013.01); *B60L 2230/20* (2013.01); *Y02T 10/7005* (2013.01); *Y02T 10/7088* (2013.01); *Y02T 90/12* (2013.01); *Y02T 90/121* (2013.01); *Y02T 90/122* (2013.01);
(Continued)

(58) Field of Classification Search
CPC  B60L 11/1829; B60L 11/182; B60L 11/1824; B60L 11/1848; B60L 11/18233; B60L 11/1827; B60L 11/1838
USPC ......................................................... 320/109
See application file for complete search history.

(56) References Cited

U.S. PATENT DOCUMENTS

| 8,912,687 B2* | 12/2014 | Kesler ................. B60L 11/182 307/10.1 |
| 8,946,938 B2* | 2/2015 | Kesler ................. B60L 11/182 307/10.1 |
| 2010/0277121 A1* | 11/2010 | Hall ...................... B60L 11/182 320/108 |

FOREIGN PATENT DOCUMENTS

| JP | 2013-055803 A | 3/2013 |
| KR | 10-2012-0081051 A | 7/2012 |
| KR | 10-1212205 B1 | 12/2012 |

* cited by examiner

*Primary Examiner* — Stacy Whitmore
(74) *Attorney, Agent, or Firm* — Novick, Kim & Lee, PLLC; Jae Youn Kim

(57) ABSTRACT

The present disclosure implements integral type wireless charging equipment for an electric car, which is a wireless power transmitting apparatus for an electric car installed in a public parking lot that supplies wireless power to electric cars of various standards having wireless power reception pads installed therein through an efficient method. The wireless power transmitting apparatus for the electric car according to the present disclosure may supply high capacity wireless power to an electric car through a plurality of transmission pads to perform quick charging, may be easily constructed in indoor or outdoor parking lots due to no restrictions regarding a place of installation, and may be useful to construct national charging infrastructure for elec- (Continued)

tric cars since unattended operation is possible through a wireless communication network.

24 Claims, 13 Drawing Sheets

(52) U.S. Cl.
CPC .............. *Y02T 90/125* (2013.01); *Y02T 90/14* (2013.01); *Y02T 90/16* (2013.01)

APPARATUS FOR TRANSMITTING WIRELESS POWER FOR ELECTRIC CAR

TECHNICAL FIELD

The present disclosure relates to an apparatus for transmitting wireless power for an electric car and more particularly, to an apparatus for transmitting wireless power for an electric car for supplying charging power in a non-contact method.

BACKGROUND ART

Recently, according to popularization of electric cars, simple and more convenient charging methods are being required, and safe and rapid charging methods are being developed. In addition, various non-contact wireless charging methods are proposed which may address inconvenience of a wired charging method for charging by plugging in an electric car.

For electric car charging, non-contact charging methods, which perform wireless charging in a short range by using a magnetic induction method and a resonant magnetic coupling method, are at the commercialization stage. Typically, non-contact charging of an electric car is performed by mounting one reception pad, which receives wireless power, in the bottom part of the electric car and installing one transmission pad, which corresponds to the reception pad, at a specific position in a parking zone. Since such a typical wireless charging method has a low transmission efficiency (e.g. 70 to 90%) and charging takes a longer time than wired charging, the transmission pad is mostly installed in a dedicated parking lot and charging is performed at night.

The magnetic induction method uses an electromagnetic induction principle that when a magnetic field is generated at a wireless power transmission coil, electricity is induced at a reception coil due to an effect of the magnetic field. The magnetic induction method is advantageous in that the transmission efficiency is very high, but has a limitation in that the transmission efficiency rapidly decreases, when a transmission coil is separated from a reception coil by several centimeters, or centers of the coils do not match. It is a magnetic field resonance method that compensates for such a limitation. In the magnetic field resonance method, a wireless transmission/reception distance is elongated and the transmission efficiency is improved by adding a resonance function to the transmission and reception coils.

Unlike the magnetic induction method, the resonant magnetic coupling method is advantageous in that wireless power transmission/reception is possible with high efficiency even in a far off place, but has a limitation in that the transmission efficiency becomes lowered by influences of an installation position of a transmission/reception module, a change in operation state, or surrounding conductors in an environment where charging is actually performed. The performance thereof is gradually improved. The magnetic induction method also generates an electromagnetic wave higher than a regulation level of each country in a place where a magnetic field is concentrated near the transmission/reception coil.

Radio frequency identification (RFID) is technology for recognizing information in the distance by using a radio wave. RFID, which includes an antenna and an integrated circuit, records information in the integrated circuit and transmits the information to a reader through the antenna. The information is used for identifying a subject to which the RFID is attached. Since the RFID reader communicates information with the RFID through a radio wave, it may read the RFID in a long distance as well as in a short distance and also receive information through an object disposed therebeween.

For reference, the related patent literature is PCT publication No. WO 2011/049352.

DISCLOSURE OF THE INVENTION

Technical Problem

It takes 6 to 8 hours to charge an electric car with a household power supply in a wired method, and takes minimum 20 minutes or longer with a high-speed charger. In addition, a charging time increases as a traveling distance is elongated. Furthermore, it is inconvenient to plug a big charging cable into an electric car several times per day and a user is at greater risk to develop an electric shock when it snows, rains, or is dark.

Typically, in a wireless charging method for an electric car, when a wireless power transmission pad for transmitting wireless power is distant away from a wireless power reception pad for receiving the wireless power, since a wireless transmission efficiency is greatly lowered, it takes longer time to charge in comparison to wired charging and an electromagnetic wave is generated around the electric car. Therefore, in order to rapidly charge a large capacity battery mounted in the electric car, the wireless power transmission and reception pads are required to be located closer to increase a wireless power transmission efficiency.

Furthermore, a typical wireless charger for an electric car has one reception pad for receiving wireless power mounted in the bottom part of the electric car and a transmission pad corresponding thereto installed at a specific position in a parking zone and enables wireless power to be transmitted/received. In order for the wireless charger to be commonly used for electric cars having different wireless power reception pad positions and different specifications, wireless charging devices of various specifications should be installed in the parking lot.

In addition, since the wireless charging of the electric car takes more charging time in comparison to wired charging due to the transmission efficiency, the charging time may be shortened by supplying wireless power of large capacity. However, for a typical wireless charging method using one wireless power transmission pad and one wireless power reception pad, it is difficult to shorten the charging time due to a structural limit of the wireless power transmission and reception pads having restrictions in magnitude and thickness.

In addition, in a typical wireless charging device for an electric car, a wireless power supply device and a wireless power transmission pad are separately installed in a parking zone. Therefore, when a plurality of wireless charging devices are installed in the parking lot, since a separate space is necessary for the wireless power supply device, a parking zone of an existing parking lot should be changed or a parking area should be contracted and installation of the wireless charging device is costly.

Technical Solution

An object of the present disclosure is to solve the above-described limitations. To this end, a wireless power transmission device for an electric car according to the present disclosure is provided in an integrated type with a plurality of wireless power transmission pads 23-1, 23-2, 23-3, which are fixed at a top end of a main body 20 having a box type or are movable, an RFID reader 21, and a short range wireless communication module 22, wherein an inside of the main body is provided with a wireless power controller and a moveable rail. The wireless power transmitting apparatus is installed in a public parking lot and provides charging power of a large capacity at a high efficiency through a plurality of wireless power transmission pads to various kinds of electric cars having different wireless power reception pad positions to allow the electric cars to be rapidly charged.

Wireless power transmitting apparatuses according to first to fourth embodiments of the present disclosure exchanges charging information with an outside through a wireless communication network 40. The wireless power transmitting apparatus is connected to a power network 41 and supplies charging power to a wireless power transmitting apparatus 50 through a wireless power supplier 42. When a stop of an electric car in a parking zone is sensed by a car detecting sensor 51, an RFID reader 53 and a short-range wireless communication module 54 operate through a wireless power controller 52. At this point, after information in the RFID 60 of the electric car is read to identify mount position information and transmission specification information on wireless power reception pad, one or more wireless power transmission pads are activated from among a plurality of wireless power transmission pads 55 to transmit wireless power of large capacity.

At this point, an electric car stopped on the wireless power transmitting apparatus activates a reception power controller 63 and a wireless charging terminal 64 on the basis of wireless charging information received from a short range wireless communication module 54 of the wireless power transmitting apparatus through a short range wireless communication module 61, receives wireless power of large capacity with the one or more mounted wireless power reception pads 62 to convert the received wireless power into charging power with the reception power controller 63, and then rapidly charges a battery 66 through the charge controller 65. The wireless charging terminal 64 provided at a driver seat is connected to the wireless communication network 40 and performs a function for transmitting wireless charging management information on the electric car, displaying a wireless charging process, and performing online payment for a charge amount.

To this end, the wireless power transmitting apparatus for an electric car according to the first and fourth embodiments are mainly installed in an outdoor parking lot and used, and have a structure of an outdoor water proof type in which a plurality of transmission pads are fixed in the top end of the main body such that wireless charging is enabled even when it snows or rains.

An operation process of a wireless power transmitting apparatus will be described with reference to FIG. 12. When an electric car enters a parking zone and is stopped by a tire stop plate, an RFID reader and a short range wireless communication module, which is provided in the top end of the wireless power transmitting apparatus, are activated by a signal from a car detection sensor provided in the tire stop plate, read RFID information about the electric car to secure position information and transmission specification information on the mounted reception pad, provide information about the wireless power transmitting apparatus to the wireless charging terminal provided at the driver seat through the short range wireless communication module, and communicate a battery charge amount, charging process information, driver's selection information, and payment information. Furthermore, the wireless power transmitting apparatus supplies power to the one or more wireless power transmission pads, which correspond to the wireless power reception pad from among the plurality of wireless power transmission pads, on the basis of the secured position information and transmission specification information on the mounted wireless power reception pad, adjusts a frequency and a matching element for resonant magnetic coupling or magnetic field resonance of a wireless power transmission pad selected as the wireless power transmission controller to perform a matching process with the wireless power reception pad, and then enables transmission of wireless power with high efficiency to one or more wireless power reception pads from the matched one or more wireless power transmission pads. When charging completion information is received through a wireless communication module, the wireless power transmission process is completed, and the wireless power transmitting apparatus becomes a standby state and maintains the standby state for wireless charging of other electric cars.

In addition, the wireless power transmitting apparatuses according to second and third embodiments are mainly installed and used in an outdoor parking lot, have a variable structure in which a wireless power transmission pad is moved in a short distance to correspond to a position of the wireless power reception pad in order to transmit wireless power at a high efficiency through a matching process.

Operation processes according to the second and third embodiments of the present disclosure almost match those of the first and fourth embodiments, and a process, in which the wireless power transmission pad moves in a short distance in correspondence to the wireless power reception pad according to the mount position information on the wireless power reception pad, is added in the middle step.

An operation process of a wireless power transmitting apparatus will be described with reference to FIG. 13. When an electric car enters a parking zone is stopped by a tire stop plate, an RFID reader and a short-range wireless communication module, which is provided in the top end of the wireless power transmitting apparatus, are activated by a signal from a car detection sensor provided in the tire stop plate, read RFID information about the electric car to secure position information and transmission specification information on the mounted wireless power reception pad, provide information about the wireless power transmitting apparatus to the wireless charging terminal, which is provided at the driver seat through the short range wireless communication module, and communicate a battery charge amount, charging process information, driver's selection information, and payment information. Furthermore, the wireless power transmitting apparatus supplies power to the one or more wireless power transmission pads, which correspond to the wireless power reception pad, from among the plurality of wireless power transmission pads on the basis of the secured position information and transmission specification information on the mounted wireless power reception pad, adjusts a frequency and a matching element for resonant magnetic coupling or magnetic field resonance of a wireless power transmission pad selected as the wireless power transmission controller to perform a matching process with the wireless power reception pad, and then enables transmission of wireless power with high efficiency to one or more wireless power reception pads from the one or more matched wireless power transmission pads. When charging completion information is received through a wireless communication module, the moved wireless power transmission pad returns to an original position and the wireless power transmission process is completed, and the wireless power transmitting apparatus becomes a standby state and maintains the standby state for wireless charging of other electric cars.

In the wireless power transmitting apparatuses for an electric car having a variable structure according to the second and third embodiments, wireless power transmissions pads 23-1 to 23-3 are separated from a home base 24 of the main body 20 to move horizontally along a moving rail 26 embedded in the main body 20 such that each of or the entirety of wireless power transmission pads 23-1, 23-2, 23-3, and 23-4 move horizontally at the same time in the top end of the main body 20 by a control of the wireless power controller 52 embedded in the main body 20. When a lift function is added to the transmission pad, which moves horizontally, to maintain a short distance to the wireless power reception pad, the transmission efficiency of the wireless power may be further increased.

Furthermore, a wireless power transmitting apparatus for an electric car according to the present disclosure is additionally equipped with a parking guidance frame around a main body in order to prevent a damage and impact to the transmitting apparatus by tire pressure, when the electric car enters the parking zone, and to guide the electric car to be parked correctly at a top part of the transmitting apparatus. In the wireless power transmitting apparatus, the main body and the parking guidance frame are detachably configured to facilitate installment and maintenance of the transmitting apparatus.

In addition, in a wireless power transmitting apparatus for an electric car according to the present disclosure, in order to realize a wireless power transmitting apparatus for storing eco-friendly energy and for using it as emergency power, a reserve power network is constructed such that power, which is secured through photovoltaic power generation, wind power generation, and a fuel cell, is stored in a battery for external power storage and supplied to the wireless power transmitting apparatus through a control of a wireless power supplier, which is controlled through a wireless communication network.

Advantageous Effects

The wireless power transmitting apparatus for an electric car according to the present disclosure has a non-contact wireless method, which does not use a charging plug, and is easy to use and safe. It is a wireless charging means, which is installed in a public parking lot, for efficiently supplying wireless power to electric cars having various specifications including different wireless power reception pad mount positions. The present disclosure may be used for constructing a charging infrastructure to contribute popularization of electric cars, since wireless power of large capacity is supplied to electric cars through a plurality of wireless power transmission pads and rapid charging is enabled.

Furthermore, the present disclosure provides an effect of shortening a time by mounting the parking guidance frame around the main body to protect the wireless power transmitting apparatus from a tire impact when the electric car enters the parking zone and by guiding the electric car to be parked correctly at the top part of the transmitting apparatus. Accordingly, the electric car may rapidly move and stop at a designated position for wireless charging.

In addition, since the wireless power transmitting apparatus for an electric car according to the present disclosure may be configured in an integrated type to be installed without a district change of an existing parking zone and with a low installation cost, a charging infrastructure may be economically constructed.

MODE FOR CARRYING OUT THE INVENTION

Hereinafter, embodiments of the present disclosure will be described in detail with reference to the accompanying drawings. In describing the present disclosure, repetitive descriptions and a detailed description of known functions and configurations will be omitted when it may obscure the subject matter of the present disclosure.

Figure 1:
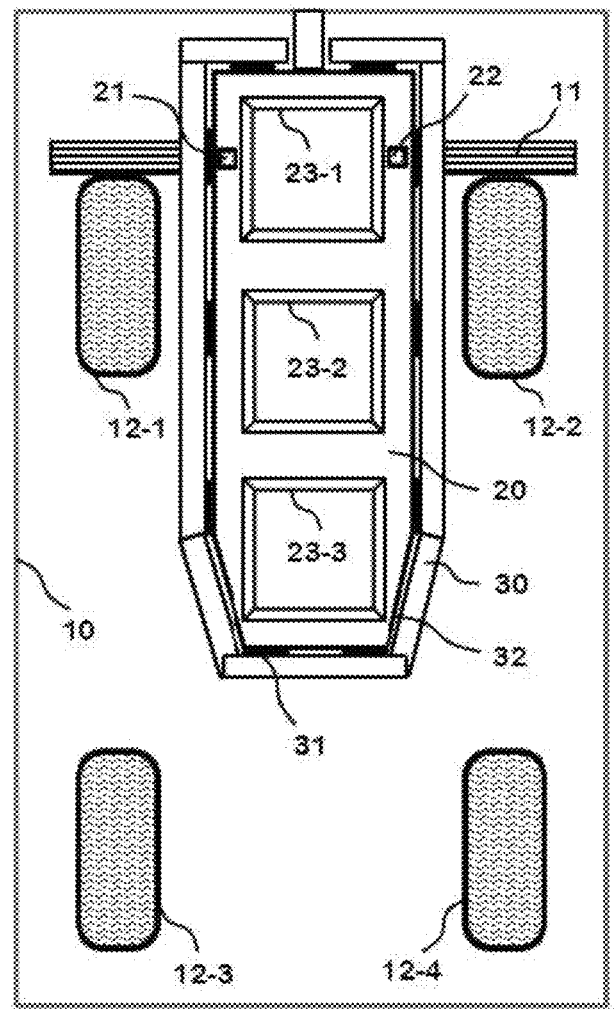
FIG. 1 illustrates a schematic structure of a wireless power transmitting apparatus according to a first embodiment of the present disclosure.
Figure 2:
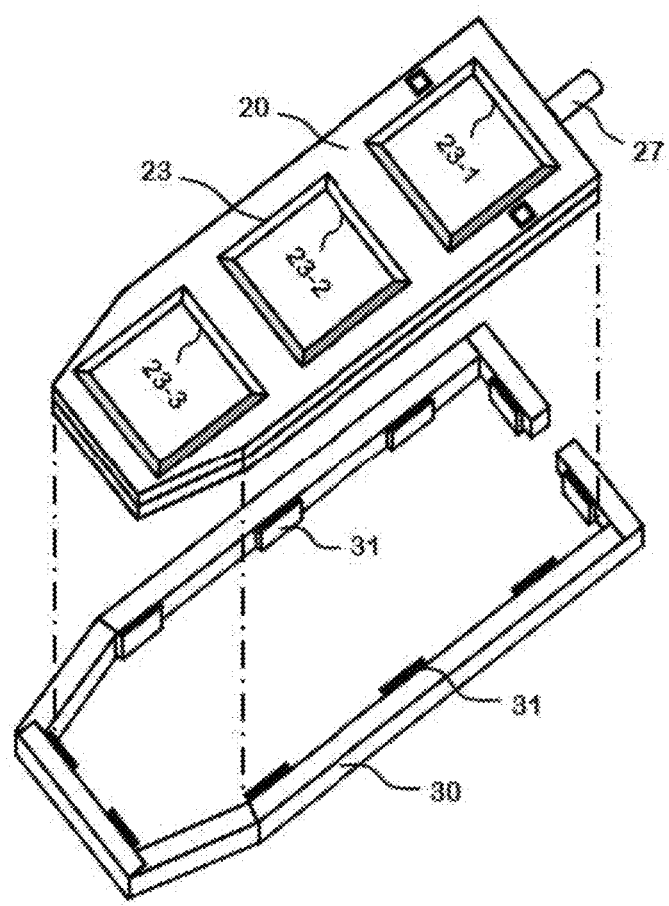
FIG. 2 illustrates a main body and a parking guidance frame of the wireless power transmitting apparatus according to the first embodiment of the present disclosure.

FIG. 1 illustrates a schematic structure of a wireless power transmitting apparatus according to a first embodiment of the present disclosure. FIG. 2 illustrates a main body and a parking guidance frame of the wireless power transmitting apparatus according to the first embodiment of the present disclosure.

As illustrated in FIG. 1, a wireless power transmitting apparatus according to the present disclosure is installed in a parking zone 10.

The wireless power transmitting apparatus according to the present disclosure includes a main body 20, one or more wireless power transmission pads 23 (23-1, 23-2, and 23-3), a radio frequency identification (RFID) reader 12, a short range communication module 22, and a wireless power controller 52.

The main body 20 has a box shape, and includes at least one wireless power transmission pads 23-1, 23-2, and 23-3 on a top cover of the main body 20, the RFID reader 21, the short range communication module 22 with a parking guidance frame 30 mounted thereabout.

The one or more wireless power transmission pads 23-1, 23-2, and 23-3 are provided in a top part of the main body and supply charging power to the electric car through a reception pad.

The RFID reader 12 is provided in the top part of the main body, and is installed at one side of the wireless power transmission pads. The RFID reader 12 communicates with RFID in a car and detects information stored therein.

The short range wireless communication module 22 is provided in the top part of the main body and is installed at one side of the wireless power transmission pad 23-1. The short range wireless communication module 22 transmits various pieces of information on the wireless power transmitting apparatus toward a wireless charging terminal of the car.

The present disclosure realizes a wireless power transmitting apparatus for supplying charging power of high capacity with an efficient wireless power supply means to various types of electric cars having different wireless power reception pad mount positions to perform rapid charging.

The tires 12-1 to 12-4 of the car illustrated in FIG. 1 represent that the electric car is stopped in the parking zone 10, and hereinafter overlapping reference numerals of the tire will be omitted.

As illustrated in FIGS. 1 and 2, the wireless power transmitting apparatus according to the present disclosure includes a parking guidance frame 30 around the main body 20. The parking guidance frame 30 is provided therein with a support part 31 formed of an impact absorption material to strongly support the main body 20 and to facilitate installation and maintenance of the wireless power transmitting apparatus. An entering part of the parking guidance frame 30 is designed to have an inclined surface for allowing a car to easily enter, and a tire stop plate 11 is installed at the left and right sides of the frame 30. Accordingly, when entering the parking zone 10, the electric car is parked correctly at the top part of the wireless power transmitting apparatus. In addition, an impact prevention gap 32 is disposed between the main body 20 and the support part 31 to protect the main body 20 from an external impact and to enable rainwater or dust, etc., to be easily discharged therethrough. Furthermore, the main body 20 and the parking guidance frame 30 may be detachably realized to facilitate installment and maintenance of the transmitting apparatus. The tire stop plate 11 is provided at one side of a car detecting sensor (not illustrated) for detecting the tire of the car. The car detection sensor senses the tire of the car to detect whether the car is stopped at a designated position.

Figure 3:
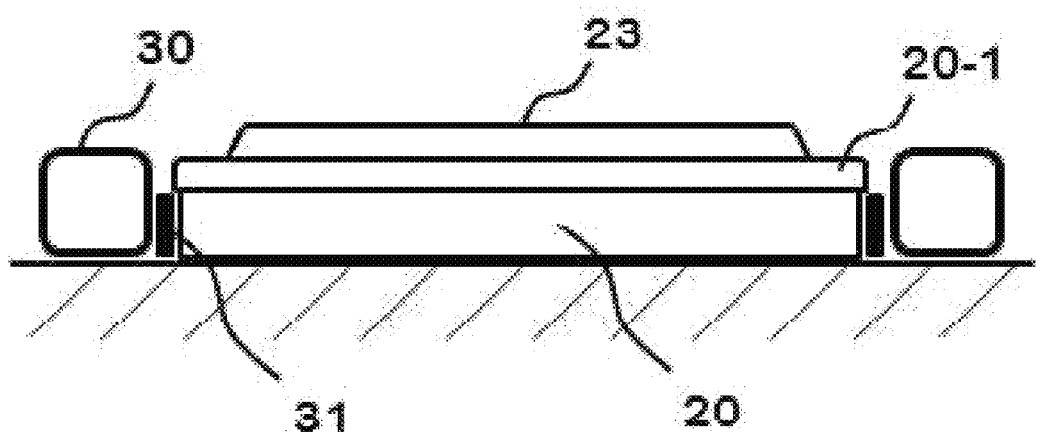
FIG. 3 is a cross-sectional view of a wireless power transmitting apparatus according to the first embodiment of the present disclosure.

FIG. 3 illustrates a schematic structure of a wireless power transmitting apparatus according to a third embodiment of the present disclosure.

As illustrated in FIG. 3, the wireless power transmitting apparatus according to the present disclosure is designed such that a main body cover 20-1 of the main body 20 is covered and a wireless power transmission pad 23 is mounted thereon. At both ends of the main body 20, the support part 31, which has the impact absorption material and is coupled to the parking guidance frame 30, supports the main body 20.

Figure 4:
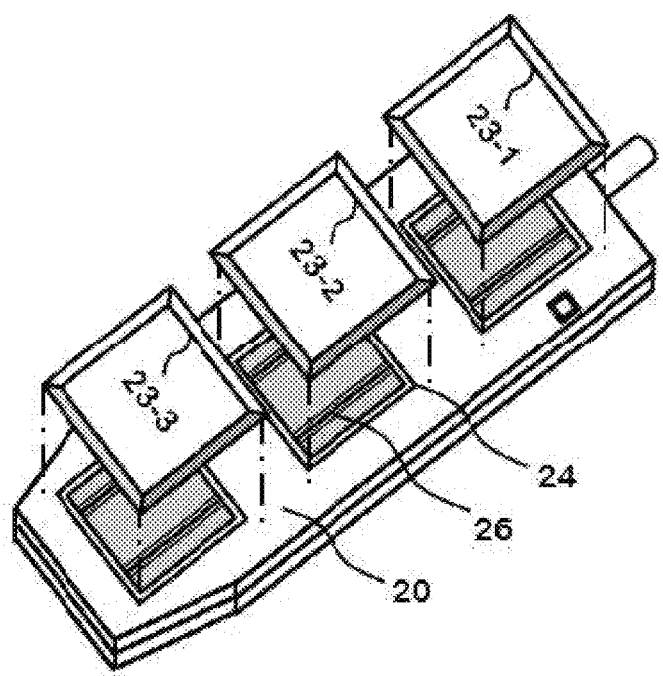
FIG. 4 is an exemplary main body of a wireless power transmitting apparatus according to a second embodiment of the present disclosure.

FIG. 4 illustrates an exemplary main body of a wireless power transmitting apparatus according to a second embodiment of the present disclosure, and illustrates a shape in which the main body 20 and the wireless power transmission pad 23 are separated.

As illustrated in FIG. 4, the second embodiment of the present disclosure pertains to a wireless power transmitting apparatus for an electric car having a variable structure.

Figure 5:
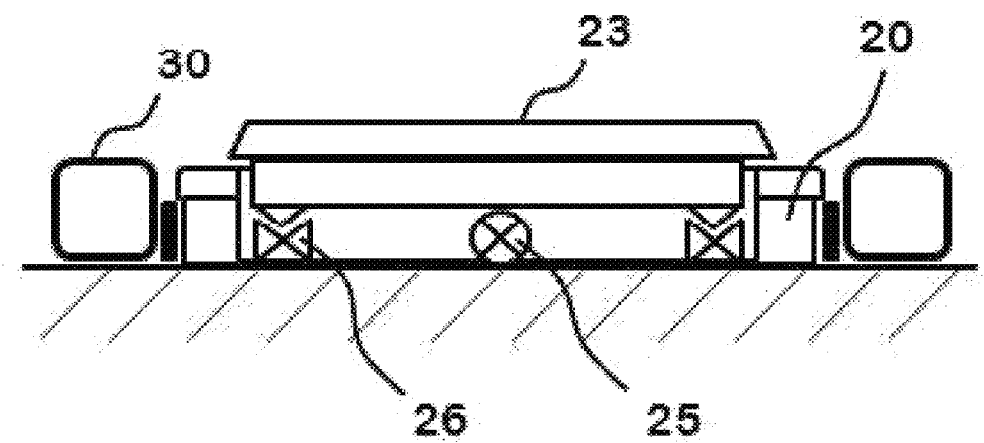
FIG. 5 is a cross-sectional view of the wireless power transmitting apparatus according to the second embodiment of the present disclosure.

The present disclosure may enable each of or the entirety of the wireless power transmission pads 23-1, 23-2, and 23-3 to move horizontally at the same time in the top part of the main body 20 by a control of the wireless power controller 52 embedded in the main body 20. The wireless power transmission pads 23-1 to 23-3 may be separated from a home base 24 of the main body 20, as illustrated in FIG. 5, and may be moved horizontally along a moveable rail 26 embedded in the main body 20.

In the present disclosure, a lift function may be added to the wireless power transmission pad, which is horizontally moved, to maintain a short distance to the reception pad in the electric car and through this, a transmission efficiency of wireless power may be further increased. FIG. 5 illustrates a schematic structure of a wireless power transmitting apparatus according to a third embodiment of the present disclosure.

Figure 6:
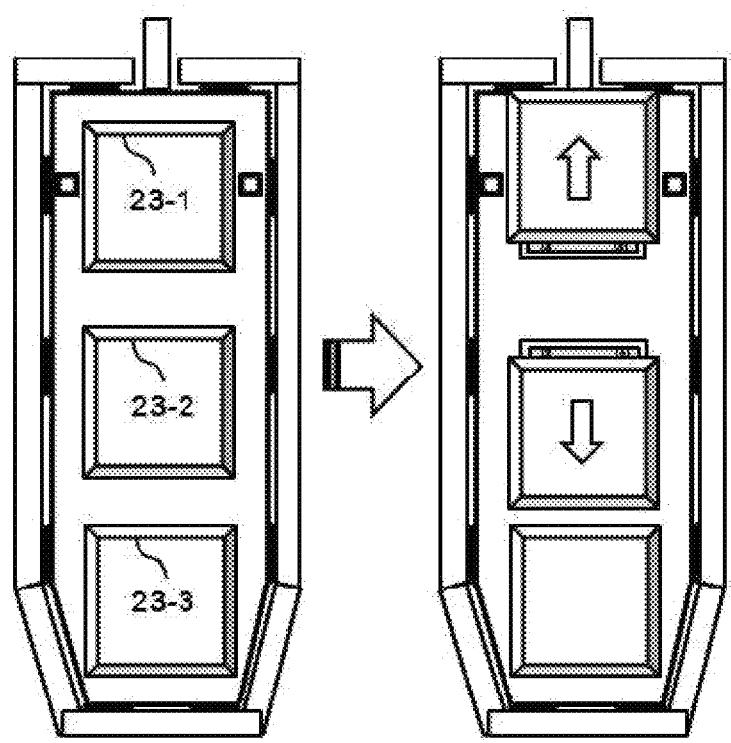
FIG. 6 is a first exemplary diagram illustrating movement of a wireless power transmission pad according to the second embodiment of the present disclosure.
Figure 7:
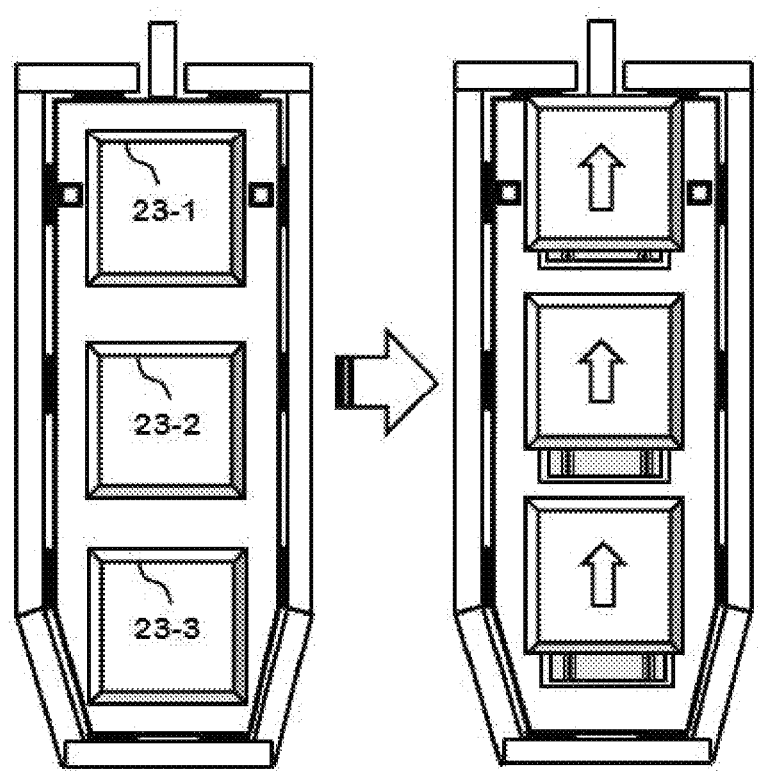
FIG. 7 is a second exemplary diagram illustrating movement of a wireless power transmission pad according to the second embodiment of the present disclosure.

FIG. 6 is a first exemplary diagram illustrating movement of a wireless power transmission pad according to the second embodiment of the present disclosure, and FIG. 7 is a second exemplary diagram.

As illustrated in FIGS. 6 and 7, the wireless power transmission pads 23-1, 23-2, and 23-3 of the wireless power transmission device may be horizontally moved individually or all together according to position information on the wireless power reception pad in the electric car. Each of or the entirety of the wireless power transmission pads 23-1, 23-2, and 23-3 according to the embodiment may be freely moved up/down to be suitable for various kinds of electric cars of which wireless power reception pad positions are different and may efficiently transmit wireless power.

Figure 8:
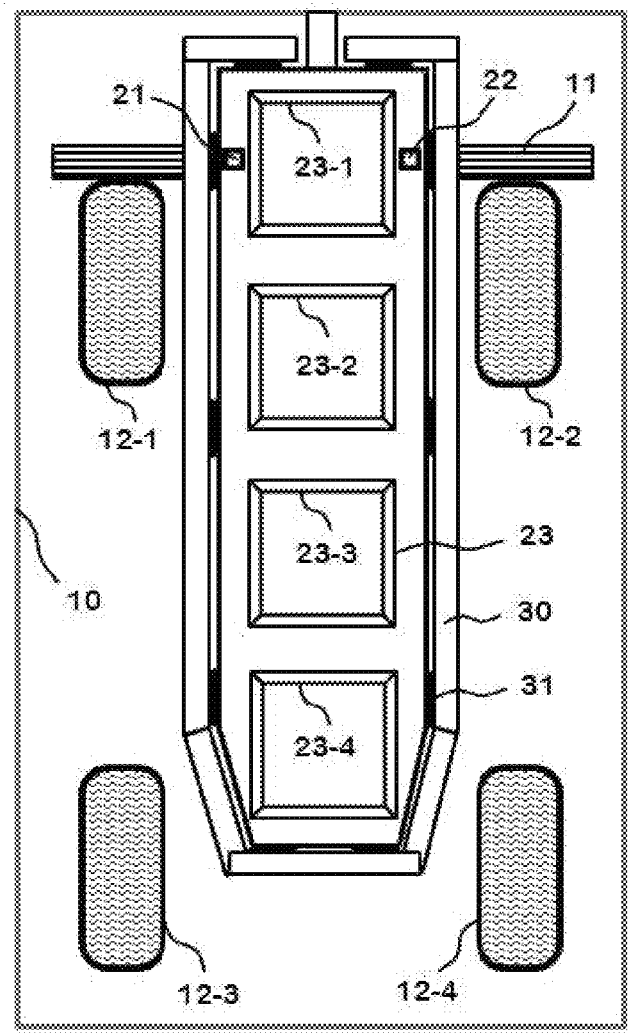
FIG. 8 illustrates a schematic structure of a wireless power transmitting apparatus according to a third embodiment of the present disclosure.

FIG. 8 illustrates a schematic structure of a wireless power transmitting apparatus according to the third embodiment of the present disclosure.

As illustrated in FIG. 8, the wireless power transmitting apparatus according to the third embodiment of the present disclosure may additionally include a wireless power transmission pad 23-4 to be applied to a medium or large size electric car, which requires a wireless power supply of larger capacity. As may be seen from the embodiment in the present disclosure, the wireless power transmitting apparatus may be usefully realized with a plurality of wireless power transmission pads installed therein limitlessly according to the electric car size and battery capacity. A basic function and wireless power transmitting process of the third embodiment illustrated in FIG. 8 are the same as those of the first embodiment, and accordingly detailed descriptions thereof will be omitted.

Figure 9:
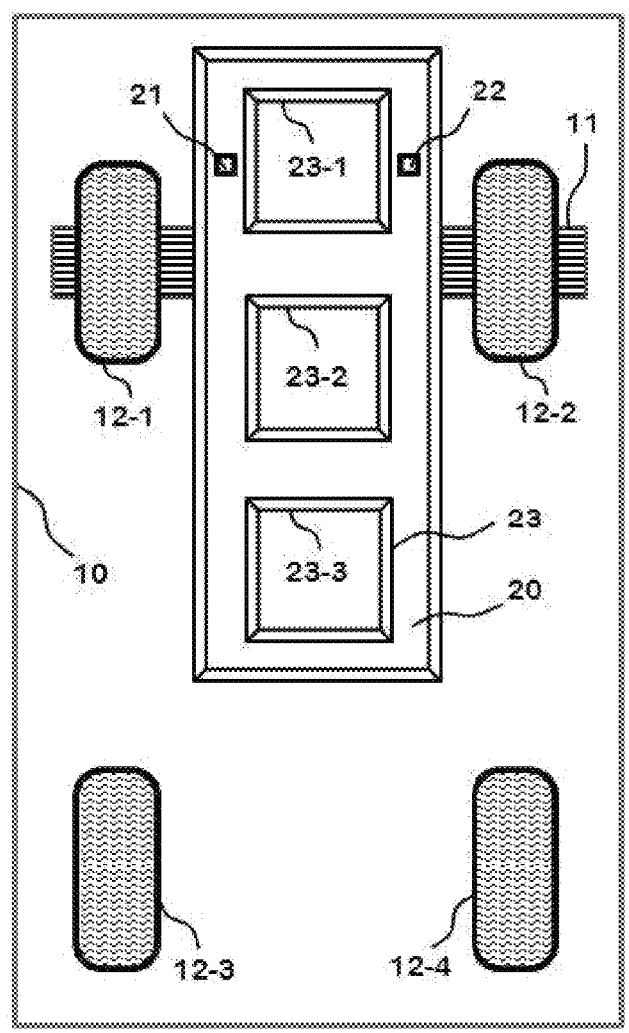
FIG. 9 illustrates a schematic structure of a wireless power transmitting apparatus according to a fourth embodiment of the present disclosure.

FIG. 9 illustrates a schematic structure of a wireless power transmitting apparatus according to a fourth embodiment of the present disclosure.

Figure 10:
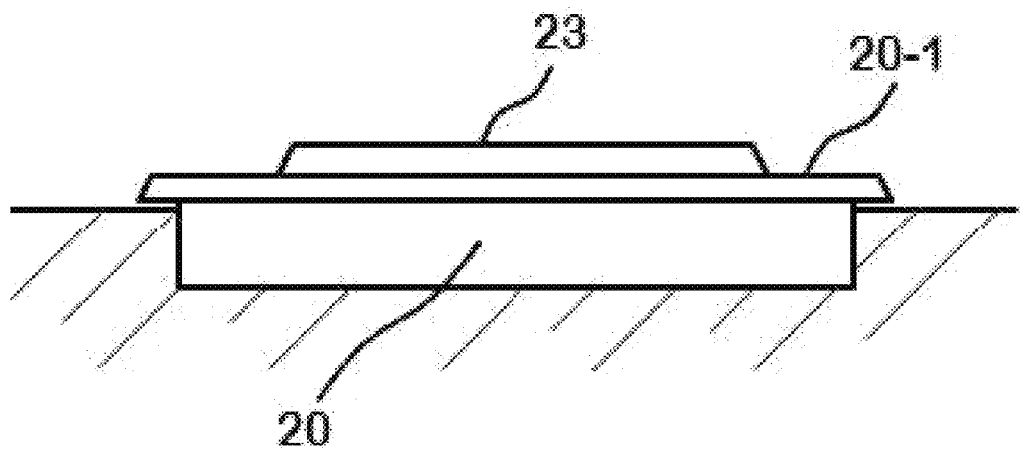
FIG. 10 illustrates that a bottom part of a main body of the wireless power transmitting apparatus according to the fourth embodiment of the present disclosure is buried under the ground.

As illustrated in FIG. 9, a wireless power transmitting apparatus according to the fourth embodiment is mainly installed in the outdoor parking zone 10 provided in a road side. In the wireless power transmitting apparatus according to the present embodiment, as illustrated in FIG. 10, the main body 20 of the wireless power transmitting apparatus may be buried under the ground of the parking zone such that tires 12-1 to 12-4 travel the top part of the wireless power transmitting apparatus when the electric car moves forward and backward for side parking. FIG. 10 illustrates that the bottom part of the main body of the wireless power transmitting apparatus according to the fourth embodiment of the present disclosure is buried under the ground.

In the present embodiment, the thicknesses of the main body cover 20-1 and the wireless power transmission pads 23 and 23-1 to 23-3 are made thin and corners thereof are made inclined to facilitate parking. In addition, an uneven tire stop plate 11 installed at the bottom of the parking zone is made such that the electric car may easily move forward and backward. A basic function and a wireless power transmission process of the present example are the same as those of the first embodiment, and accordingly detailed descriptions thereof will be omitted.

Figure 11:
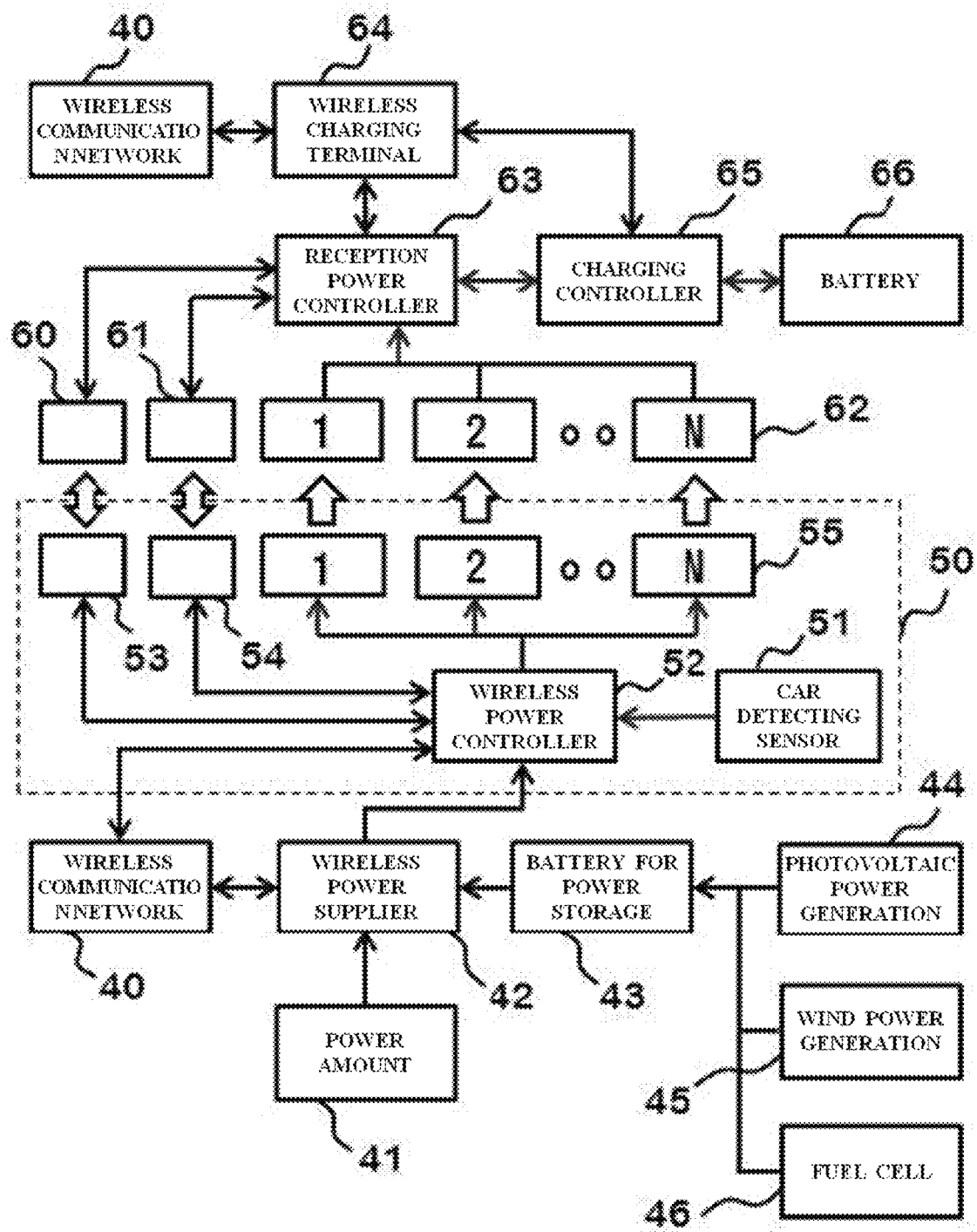
FIG. 11 is a block diagram of a wireless power transmitting apparatus according to the present disclosure.

FIG. 11 is a block diagram of a wireless power transmitting apparatus according to the present disclosure.

As illustrated in FIG. 11, a wireless power transmitting apparatus exchanges charging information with the outside through a wireless communication network 40 and is connected to a power network 41 through a wireless power supplier 42 to receive charging power. In addition, when recognizing a stop of the electric car at the parking zone through a car detecting sensor 51, the wireless power transmitting apparatus activates an RFID reader 53 and a short range communication module 54 under a control of a wireless power controller 52. The wireless power controller 52 communicates with RFID 60 of the electric car through a RFID reader 53 to detect mount position information and transmission specification information on the wireless power reception pad and then activates one or more wireless power transmission pads 55 to wirelessly transmit wireless power of large capacity.

On the other hand, the electric car stopping on the wireless power transmitting apparatus activates a reception power controller 63 and a wireless charging terminal 64 on the basis of wireless charging information received from a short range wireless communication module 54 at the side of the wireless power transmission device through a short range communication module 61. In addition, when wireless power of large capacity is received through one or more wireless power reception pads 62, a reception power controller 63 converts the received wireless power into charging power and a charging controller 65 rapidly charges a battery 66 with the converted charging power. The wireless charging terminal 64 provided at the driver seat is connected to the wireless communication network 40 and performs a function for transmitting wireless charging management information on the electric car to a wireless charging management station, displaying a wireless charging process, and performing online payment for a charge amount.

In order to realize the wireless power transmitting apparatus for an electric car, which uses eco-friendly energy as emergency power, in the present disclosure, power secured through photovoltaic power generation 44, wind power generation 45, and fuel cell 46 is stored in a battery for external power storage and is supplied, to the wireless power transmitting apparatus 50, through a control of the wireless power supplier 42, which is remotely controlled through a wireless communication network.

Figure 12:
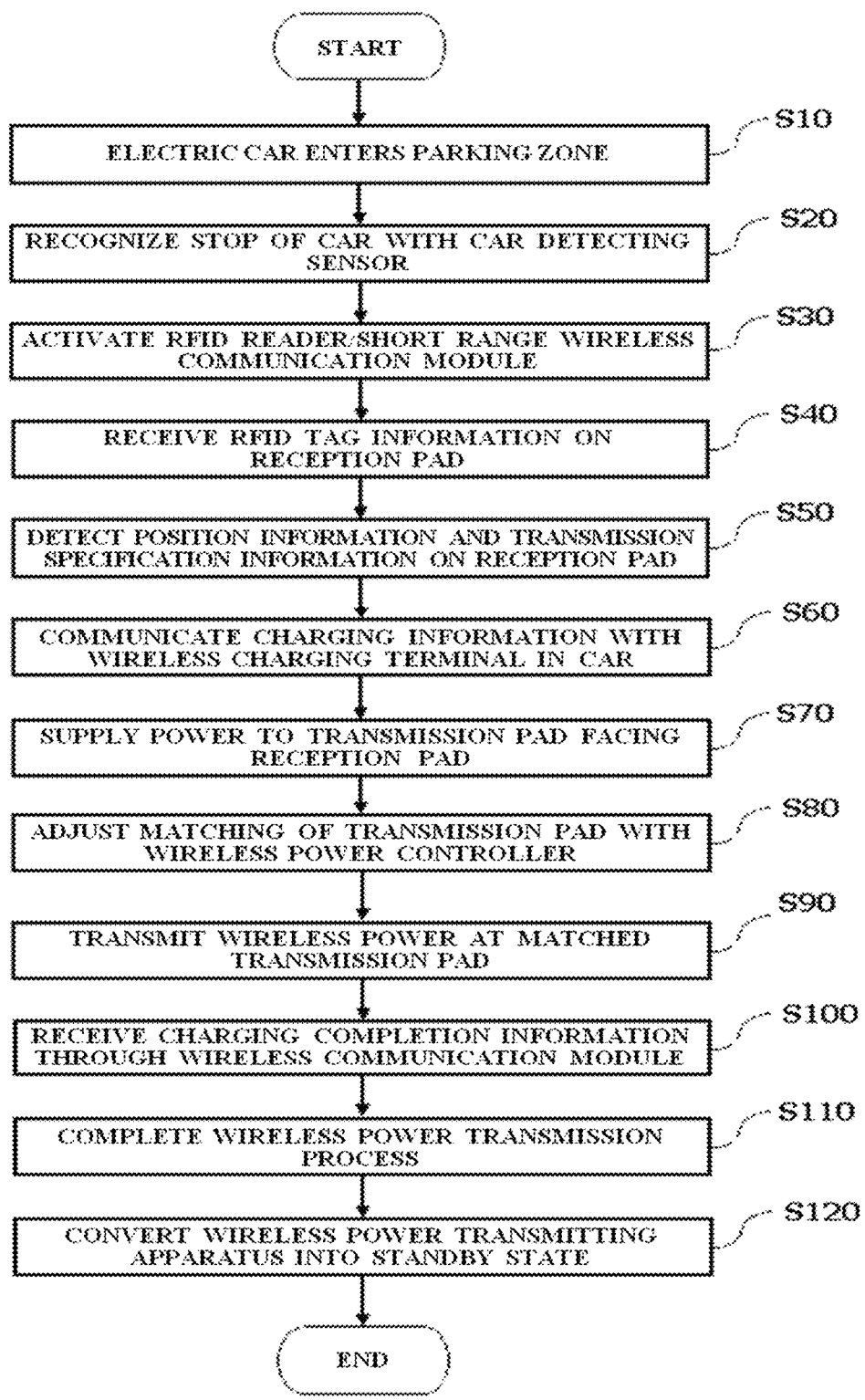
FIG. 12 is a flowchart illustrating an operation of the wireless power transmitting apparatus according to the first and fourth embodiments of the present disclosure.

FIG. 12 is a flowchart illustrating operations of the wireless power transmitting apparatuses according to first and fourth embodiments of the present disclosure. As illustrated in FIG. 12, an operation process of the wireless power transmitting apparatus according to the embodiment will be described as the following.

When an electric car enters a parking zone and is stopped by a tire stop plate, the wireless power controller 52 perceives an outgoing signal of the car detecting sensor 51 provided in the tire stop plate, and activates the RFID reader 53 and the short range wireless communication module 54 provided in a top end of the wireless power transmitting apparatus (operation S10 to S30). In addition, the wireless power controller 52 reads RFID information for the electric car to detect position information and transmission specification information on the mounted wireless power reception pad, and provides information on the wireless power transmitting apparatus toward the wireless charging terminal provided at the driver seat through the short range wireless communication module 54 (operation S40 to S60). At this point, the information on the wireless power transmitting apparatus may be a battery charge amount, charge progress information, driver's selection information, and payment information. The wireless power controller 52 supplies power to a wireless power transmission pad facing a wireless power reception pad in the electric car with reference to the detected position information and the transmission specification information on the wireless power reception pad (operation S70). Then, the wireless power controller 52 adjusts a frequency and a matching element for resonant magnetic coupling or magnetic field resonance of the wireless power transmission pad to perform matching with the wireless power reception pad, and then enables wireless power transmission of high efficiency through a plurality of matched wireless power transmission pads (operation S80 and S90). When the wireless power transmission is completed, the wireless power controller 52 receives charge completion information through a wireless communication module and converts the wireless power transmitting apparatus into a standby state to maintain the standby state until wireless charging of another electric car starts (operation S100 to S120).

Figure 13:
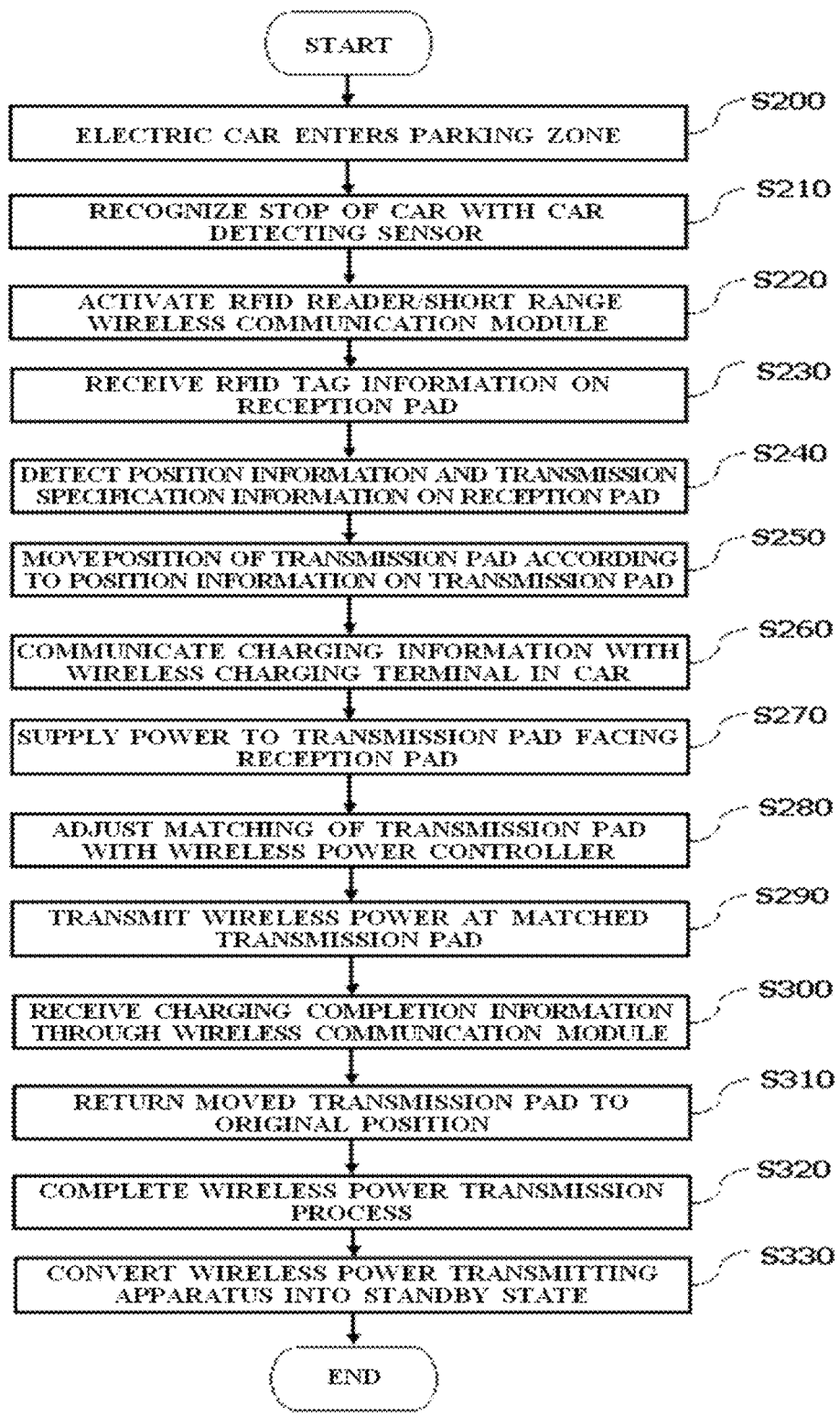
FIG. 13 is a flowchart illustrating an operation of the wireless power transmitting apparatus according to the second and third embodiments of the present disclosure.

FIG. 13 is a flowchart illustrating an operation of the wireless power transmitting apparatus according to the second and third embodiments of the present disclosure.

Operation processes according to the second and third embodiments of the present disclosure are entirely the same as those of the first and fourth embodiments. However, as the intermediate operation, an operation S250 is added in which the wireless power transmission pad is moved to a position in a short distance (e.g. a shortest distance) from the wireless power reception pad and faces the wireless power reception pad according to the mount position information about the wireless power reception pad. As illustrated in FIG. 13, an operation process of a wireless power transmitting apparatus according to an embodiment will be described as the following.

When the electric car enters a parking zone and is stopped by a tire stop plate, the wireless power controller 52 perceives an outgoing signal of the car detecting sensor 51 provided in the tire stop plate, and activates the RFID reader 53 and the short range wireless communication module 54 provided in a top end of the wireless power transmitting apparatus (operation S200 to S220). Then the wireless power controller 52 reads the RFID information for the electric car to detect position information and transmission specification information on the mounted wireless power reception pad, and moves the wireless power transmission pad in a short distance (e.g. a shortest distance) from the wireless power reception pad according to the detected information (operations S230 to S250). In addition, the wireless power controller 52 provides information on the wireless power transmitting apparatus toward a wireless charging terminal provided on the driver seat through the short range wireless communication module 54 (operation S260).

The wireless power controller 52 supplies power to a wireless power transmission pad facing the wireless power reception pad in the electric car with reference to the detected position information and the transmission specification information on the wireless power reception pad (operation S270). Then, the wireless power controller 52 adjusts a frequency and a matching element for resonant magnetic coupling or magnetic field resonance of the wireless power transmission pad to perform matching with the wireless power reception pad, and then enables wireless power transmission of high efficiency through a plurality of matched wireless power transmission pads (operation S280 and S290). When the wireless power transmission is entirely completed, the wireless power controller 52 receives charging completion information through the wireless communication module and allows the moved wireless power transmission pad to return to an original position (operation S300 to S320). In addition, the wireless power transmitting apparatus is converted into a standby state and maintains the standby state until wireless charging of another electric car is started (operation S330).

The present disclosure can be modified or changed in various methods by a person of ordinary skill in the art without departing from the subject matter claimed in the appended claims. Therefore, the technical scope of the present disclosure is not limited to the above-mentioned particular preferred embodiment.

INDUSTRIAL APPLICABILITY

As a wireless power transmitting apparatus for an electric car, which is useful for constructing a charging infrastructure accompanied with popularization of electric cars, since rapid charging is provided to the electric car with an efficient wireless power transmitting means, the present disclosure may contribute to popularization of electric cars and development of related industries.

In addition, a wireless power transmitting apparatus for an electric car of the present disclosure is integrated type wireless charging equipment and has no limit to an installation site. Accordingly the wireless power transmitting apparatus may be easily constructed in an outdoor parking lot and unmanned operation thereof is possible through a wireless communication network. In addition, the wireless power transmitting apparatus may be usefully employed to construct a nationwide charging infrastructure for electric cars.

The invention claimed is:

1. A wireless power transmitting apparatus for an electric car, the wireless power transmitting apparatus comprising:
a main body installed in a parking zone;
a car detecting sensor installed at one side in the parking zone and sensing a tire of the car to detect whether a car is stopped at a prescribed position;
one or more wireless power transmission pads installed in a top part of the main body and supplying wireless power toward a wireless power reception pad of the car under a control of a wireless power controller;
a radio frequency identification (RFID) reader installed on one side of one of the one or more wireless power transmission pads and communicating with a RFID of the car to detect information stored in the RFID; and
a short range wireless communication module installed on the one or another side of one of the one or more wireless power transmission pads and transmitting various pieces of information on the wireless power transmitting apparatus to a wireless charging terminal of the car,
wherein the wireless power controller is installed inside the main body to control the RFID reader, the short range wireless communication module and the one or more wireless power transmission pads and connected to a wireless communication network, and controls wireless transmission of power supplied through a wireless power supplier,
wherein when the RFID reader detects position information and transmission specification information on the wireless power reception pad, the wireless power controller selects one of the one or more wireless power transmission pads, which corresponds to the wireless power reception pad, on a basis of the detected information, performs a matching process for transmission on a basis of charging information on the car, the charging information being communicated through the short range communication module, and then performs wireless power supplying.

2. The wireless power transmitting apparatus according to claim 1, wherein the car detecting sensor is installed at a tire stopping plate separately provided at one of a left and a right sides of the main body.

3. The wireless power transmitting apparatus according to claim 1, wherein the main body has a box structure and is coupled to a cover part, which forms the top part of the main body.

4. The wireless power transmitting apparatus according to claim 1, wherein the one or more wireless power transmission pads matches wireless power in accordance with a transmission specification condition of the wireless power reception pad of the car in a magnetic induction, resonant magnetic coupling, or magnetic field resonance under a control of the wireless power controller to perform the wireless transmission of power.

5. The wireless power transmitting apparatus according to claim 1, wherein the RFID reader reads RFID information in the car to detect mount position information and transmission specification information on the wireless power reception pad of the car.

6. The wireless power transmitting apparatus according to claim 1, wherein the short range wireless communication module communicates with a short range wireless communication module of the car to transmit the wireless power transmission information for the wireless power controller to the car and to receive a battery charging amount, charging process information, driver's selection information, and payment according to the charge amount in the car.

7. The wireless power transmitting apparatus according to claim 1, wherein the one or more wireless power transmission pads has a lift function through which a height thereof is adjustable upward or downward.

8. The wireless power transmitting apparatus according to claim 1, wherein the main body has a shape in which both side surfaces of a side that the car enters, have trapezoidal slopes for allowing the car to easily proceed over the main body when the car is parked.

9. The wireless power transmitting apparatus according to claim 1, wherein one side of a bottom part of the main body is buried under a ground surface of the parking zone and a part thereof is exposed over the ground surface and the one or more wireless power transmission pads mounted on the top part thereof have inclined edges.

10. The wireless power transmitting apparatus according to claim 1, wherein the wireless power supplier allows energy, which is generated by photovoltaic power generation, wind power generation, and a fuel cell, to be stored in a battery for a power storage and is supplied as emergency power.

11. The wireless power transmitting apparatus according to claim 1, wherein the wireless power controller recognizes a stop of the car through the car detecting sensor when the car enters the parking zone, operates the RFID reader and the short range wireless communication module, communicates with the RFID of the car through the RFID reader to detect the position information and the transmission specification information on the wireless power reception pad, transmits charging information toward a wireless charging terminal in the car through the short range wireless communication module, supplies power to the one or more the wireless power transmission pads facing the wireless power reception pad, adjusts matching with the one or more wireless power transmission pads, transmits wireless power at the matched wireless power transmission pad, and when the wireless power transmission process is completed, receives charging completion information through the short range wireless communication module.

12. A wireless power transmitting apparatus for an electric car, the wireless power transmitting apparatus comprising:
a main body installed in a parking zone;
a car detecting sensor installed at one side in the parking zone and sensing a tire of the car to detect whether a car is stopped at a prescribed position;
a home base provided in a top part of the main body as a space in which each of one or more wireless power transmission pads is moveable;
a moveable rail installed inside the home base for a movement of each of the one or more wireless power transmission pads, wherein each of the one or more wireless power transmission pads is configured to move on the moveable rail for facing a wireless power reception pad of the car and supply wireless power toward the reception pad of the car under a control of a wireless power controller;
an RFID reader installed in one side of one of the one or more the wireless power transmission pads and communicating with an RFID of the car to detect information stored in the RFID;
a short range wireless communication module installed on one side of one of the one or more wireless power transmission pads and transmitting various pieces of information on the wireless power transmitting apparatus toward a wireless charging terminal of the car,
wherein the wireless power controller is installed inside the main body to control the RFID reader, the short range wireless communication module and the one or more wireless power transmission pads, connected to a wireless communication network, and controls wireless transmission of power supplied through a wireless power supplier; and
a parking guidance frame formed around the main body and preventing a damage of the main body due to tire pressure of the car and guiding a correct parking.

13. The wireless power transmitting apparatus according to claim 12, wherein when the RFID reader detects the position information and transmission specification information on the wireless power reception pad, the wireless power controller moves positions of the one or more wireless power transmission pads along the moveable rail for allowing the one or more wireless power transmission pads to face the wireless power reception pad on a basis of the detected information, performs a matching process for transmission on a basis of the charging information of the car, which is communicated through the short range wireless communication module, and then performs wireless power supplying.

14. The wireless power transmitting apparatus according to claim 12, where the parking guidance frame comprises therein a plurality of support parts for supporting the main body and forming a gap with a constant interval from the main body.

15. The wireless power transmitting apparatus according to claim 12, wherein the wireless power controller recognizes a stop of the car through the car detecting sensor when the car enters the parking zone, operates the RFID reader and the short range wireless communication module, communicates with the RFID of the car through the RFID reader to detect the position information and the transmission specification information on the wireless power reception pad, moves the one or more wireless power transmission pad to a short distance from the wireless power reception pad according to the position information and transmission specification information on the detected wireless power reception pad, transmits charging information toward a wireless charging terminal in the car through the short range wireless communication module, supplies power to the one or more wireless power transmission pads facing the wireless power reception pad, adjusts matching with the transmission pad, transmits wireless power at the matched wireless power transmission pad, receives charge completion information through the short range wireless communication module when the wireless power transmission process is completed, and returns the moved wireless power transmission pad to an original position.

16. The wireless power transmitting apparatus according to claim 12, wherein the car detecting sensor is installed at a tire stopping plate separately provided at one of a left and a right sides of the main body.

17. The wireless power transmitting apparatus according to claim 12, wherein the main body has a box structure and is coupled to a cover part, which forms the top part of the main body.

18. The wireless power transmitting apparatus according to claim 12, wherein the one or more wireless power transmission pads matches wireless power in accordance with a transmission specification condition of the wireless power reception pad of the car in a magnetic induction, resonant magnetic coupling, or magnetic field resonance under a control of the wireless power controller to perform the wireless transmission of power.

19. The wireless power transmitting apparatus according to claim 12, wherein the RFID reader reads RFID information in the car to detect mount position information and transmission specification information on the wireless power reception pad of the car.

20. The wireless power transmitting apparatus according to claim 12, wherein the short range wireless communication module communicates with a short range wireless communication module of the car to transmit the wireless power transmission information for the wireless power controller to the car and to receive a battery charging amount, charging process information, driver's selection information, and payment according to the charge amount in the car.

21. The wireless power transmitting apparatus according to claim 12, wherein the one or more wireless power transmission pads has a lift function through which a height thereof is adjustable upward or downward.

22. The wireless power transmitting apparatus according to claim 12, wherein the main body has a shape in which both side surfaces of a side that the car enters, have trapezoidal slopes for allowing the car to easily proceed over the main body when the car is parked.

23. The wireless power transmitting apparatus according to claim 12, wherein one side of a bottom part of the main body is buried under a ground surface of the parking zone and a part thereof is exposed over the ground surface and the one or more wireless power transmission pads mounted on the top part thereof have inclined edges.

24. The wireless power transmitting apparatus according to claim 12, wherein the wireless power supplier allows energy, which is generated by photovoltaic power generation, wind power generation, and a fuel cell, to be stored in a battery for a power storage and is supplied as emergency power.

* * * * *